Jan. 12, 1932.  J. KERN  1,841,291
COMPACT MANICURING IMPLEMENT
Filed Feb. 2, 1931   2 Sheets-Sheet 1
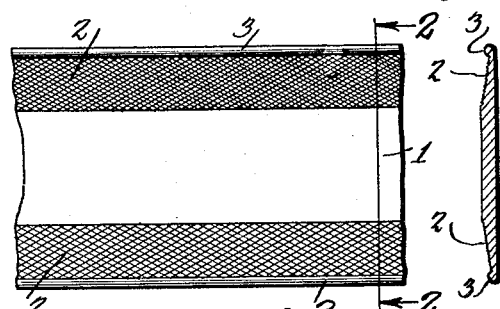
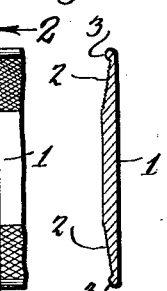
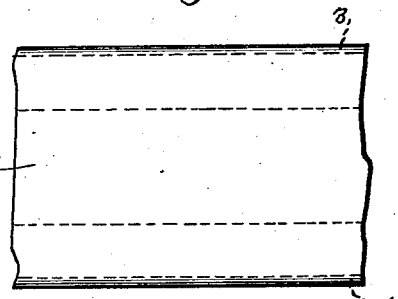
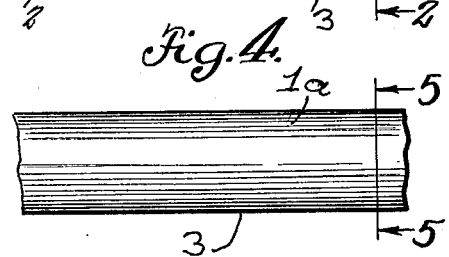
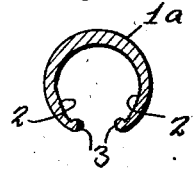
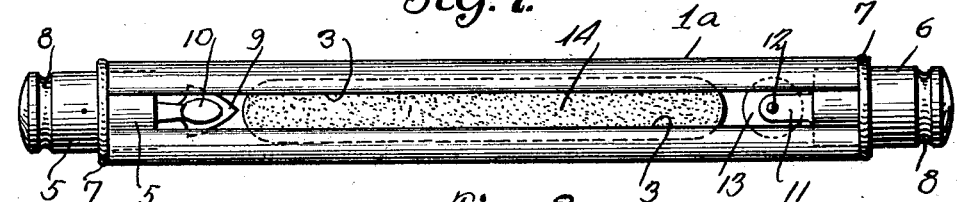
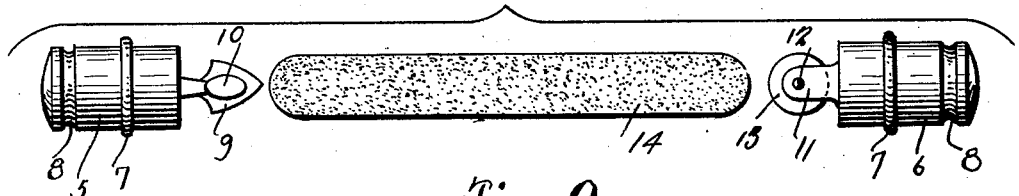
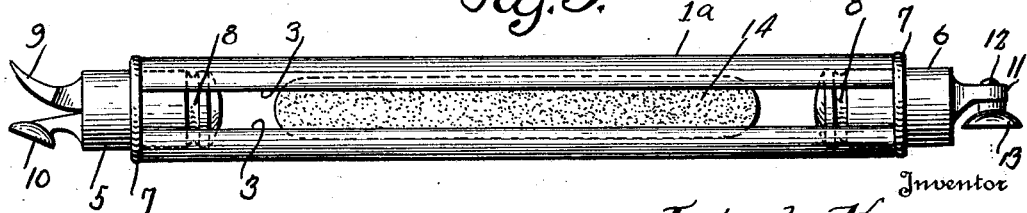
Inventor
Joseph Kern.
By Bryant & Lowry
Attorneys Jan. 12, 1932.  J. KERN  1,841,291
COMPACT MANICURING IMPLEMENT
Filed Feb. 2, 1931  2 Sheets-Sheet 2
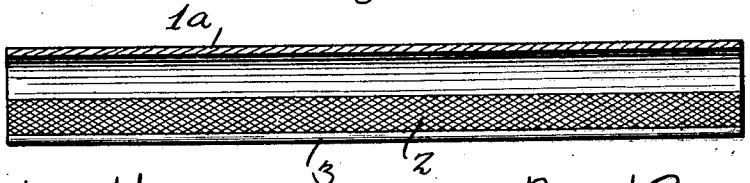
Fig. 10.
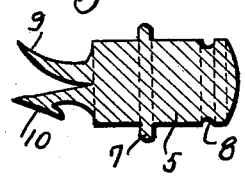
Fig. 11.
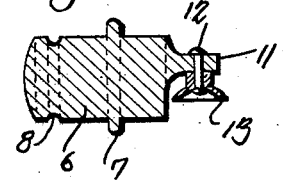
Fig. 12.
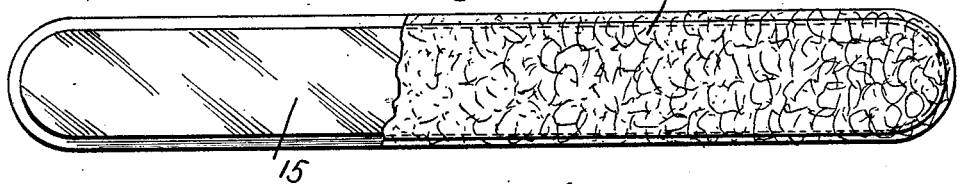
Fig. 13.
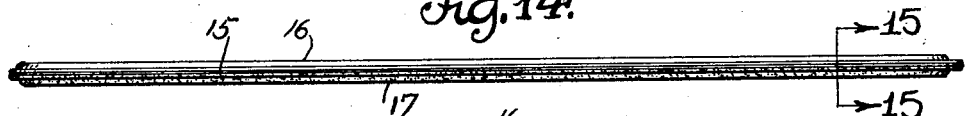
Fig. 14.
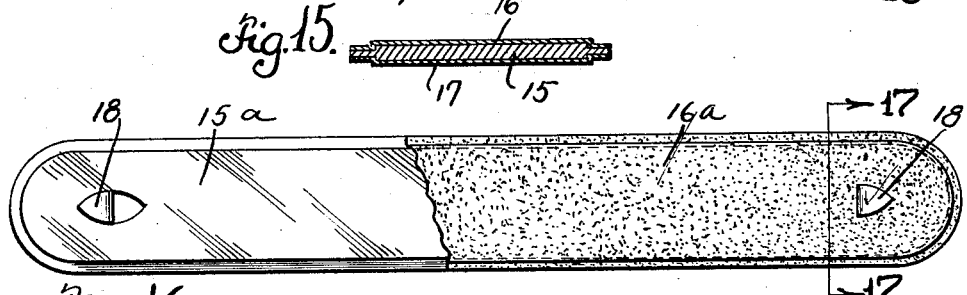
Fig. 15.
Fig. 16.
Fig. 17.
Inventor
Joseph Kern.
By Bryant & Lowry
Attorneys Patented Jan. 12, 1932

1,841,291

UNITED STATES PATENT OFFICE

JOSEPH KERN, OF NEW BRITAIN, CONNECTICUT, ASSIGNOR OF ONE-FOURTH TO JAN P. CLARY, OF HARTFORD, CONNECTICUT

COMPACT MANICURING IMPLEMENT

Application filed February 2, 1931. Serial No. 512,986.

This invention relates to certain new and useful improvements in a compact manicuring implement and method of making the same.

The primary object of the invention is to provide a compact manicuring implement of a size comparable with a pencil or fountain pen that may be readily carried in a pocket or purse and include a complete set of manicuring devices for finger nails, such as a nail file, a cuticle cutter, a nail cleaner and cuticle pusher or cleaner and a combined sand paper strip and buffer.

A further object of the invention is to provide a compact manicuring implement of the foregoing character wherein the nail filing portions thereof are of different degrees of fineness with a smooth edge at each file portion positionable beneath the nail when the device is in use to prevent injury to the finger flesh and cuticle, the file portion being designed to produce a rounded edge on the nail without rotating or otherwise shifting the implement during a filing operation.

A still further object of the invention resides in the method of manufacturing the implement and especially in the formation of the barrel portion thereof from a flat strip or blank of material that is rolled to assume an appropriate configuration in cross-section.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary plan view of the inner face of a blank strip from which the manicuring implement is formed, showing unroughened smooth side edges with nail file sections at each side of the blank of different degrees of fineness, disposed inwardly of the edges;

Figure 2 is a cross-sectional view taken on line 2—2 of Figure 1;

Figure 3 is a fragmentary plan view of the blank showing the outer side;

Figure 4 is a fragmentary plan view showing the blank in rolled formation;

Figure 5 is a cross-sectional view taken on line 5—5 of Figure 4, showing the blank rolled into tubular formation with the opposite side edges spaced from each other and the inwardly disposed nail filing areas;

Figure 6 is a cross-sectional view, similar to Figure 5 showing another configuration in cross-section, the tube having flattened sides adjacent its spaced edges;

Figure 7 is a side elevational view of the completed compact manicuring implement showing end plugs carrying manicuring devices seated in the tube ends and a combined sand paper strip and buffer within the tube;

Figure 8 shows side elevational views of the manicuring accessories;

Figure 9 is a side elevational view of the device showing the end plugs reversibly mounted in the tube with the manicuring devices exposed for use;

Figure 10 is a longitudinal sectional view of the tube or holder showing the plain edge and the inwardly set file portion;

Figure 11 is a longitudinal sectional view of one of the manicuring devices for cleaning the nails and pushing the cuticle backwardly from the nail;

Figure 12 is a longitudinal sectional view of another manicuring device showing a disk cutter for cuticle;

Figure 13 is a plan view, partly broken away of the combined sand paper strip and buffer;

Figure 14 is an edge elevational view of the device shown in Figure 13;

Figure 15 is a cross-sectional view taken on line 15—15 of Figure 14 showing the sand paper strip and buffer chamois adhesively secured to opposite sides of a thin metal backing strip;

Figure 16 is a plan view, partly broken away showing another form of sand paper device and buffer; and Figure 17 is cross-sectional view taken on line 17—17 of Figure 16 showing a wadding or cushioned backing for the buffer chamois.

In the manufacture of the compact manicuring implement, the same is formed from a flat metallic strip 1 as shown in Figures 1 to 3 with one face thereof tapering from points laterally of the longitudinal axis toward opposite side edges and roughened over said tapered faces as at 2 to provide nail filing sections of different degrees of fineness. The nail filing sections or surfaces 2 terminate inwardly of the opposite side edges of the blank strip 1 and said edges as indicated at 3 are unroughened and smooth for purposes presently to appear. The blank strip 1 is then rolled into tubular formation as shown at 1a in Figs. 4 and 5 with the rolled edges 3 spaced from each other, the nail filing surfaces 2 being disposed at the inner sides of the tube. The cross-sectional configuration of the tube may embody different forms, Figure 6 showing the tube 1b flattened on the sides thereof adjacent the spaced edges as at 4 for better gripping or the like in the manipulation of the device.

The manicuring devices carried by the tube 1a include end plugs 5 and 6 seated in the ends of the tube 1a and limited in such seating movement by the annular flange 7 engaging the adjacent tube end as shown in Figure 7, the outer end of each plug being fashioned as at 8 to facilitate the gripping thereof in removing the same from the tube for the use of the manicuring devices carried by the opposite ends of the plugs which are normally housed within the tube as shown in Figure 7.

The plug 5 carries upon one end thereof a nail cleaner 9 employed for removing foreign matter from beneath the nails and the same end of the plug 5 carries an element 10 for pushing backwardly the cuticle that overlies the finger nail, the devices 9 and 10 being separately useable.

The plug 6 as shown in Figure 12 carries an end lug 11 upon its inner end that carries a cross-pin 12 upon which a rotary disk cutter 13 is mounted to be employed for the cutting of cuticle. When the implement is out of use, the end plugs 5 and 6 are inserted in the ends of the tube 1a with the manicuring devices housed within the tube and when said implement is in use, the plugs are reversibly mounted as shown in Figure 9.

A combined sand papering device and nail buffer 14 is illustrated as carried within the tube in Figures 7 to 9 and is removable therefrom for use, the detail construction thereof being shown in Figures 13 to 15 while a modified form of this device is shown in Figures 16 and 17. As shown in Figures 13 to 15, the device includes a relatively thin metal strip backing 15 having a strip of sand paper 16 adhesively secured to one face thereof and a buffer strip of chamois 17 adhesively secured to the other face, the marginal edges of the backing strip 15 being reduced as shown in Figure 15 to facilitate handling of the device.

In the form of buffer device shown in Figs. 16 and 17, the thin metal backing strip 15a is provided with struck out prongs 18 to clamp the sand paper strip 16a in position in addition to adhesive mounting thereof while the buffer chamois strip 17a carried by the other side of the backing strip 15a overlies packing material 19 with the edges thereof secured by overturned flanged edges 20 on the backing strip 15a as shown in Figure 17, thus providing a cushioned buffer.

The use of the manicuring implements carried by the end plugs 5 and 6 is hereinbefore set forth and the combined sand paper strip and buffer is removable from the tube 1a for use. In the operation of the nail file, surfaces 2, the finger nail is inserted between the spaced rolled edges 3 of the tube 1a, the rolled edge 3 being positioned between the nail and finger to eliminate the possibility of injury to the flesh of the finger and to present the nail edge to the desired file surface 2. The curvature of the file surface produces a rounded edge on the finger nail without special manipulation of the tube and accomplishes a more perfect filing of the finger nail with injury to the flesh of the finger eliminated as would be possible with the ordinary flat nail file.

While there are herein shown and described the preferred embodiments of the present invention, it is nevertheless to be understood that minor changes may be made therein without departing from the spirit and scope of the invention as claimed.

I claim:—

1. A compact manicuring implement comprising a tubular member slotted along one side with nail filing surfaces on the inner face adjacent each edge, a reversible plug in each end of the tube and carrying manicuring devices on one end, and a combined sand paper strip and buffer housed within the tubular member.

2. In a sander and polisher of the character described, a relatively thin flexible metallic backing strip, sand paper secured to one side of the strip and a buffer chamois secured to the other side thereof.

3. In a sander and polisher of the character described, a relatively thin flexible metallic backing strip, sand paper adhesively secured to one side of the backing strip, and a buffer chamois adhesively secured to the other side thereof.

4. In a sander and polisher of the character described, a relatively thin flexible metallic backing strip, sand paper adhesively secured to one side of the backing strip, fingers struck out from the strip for further anchoring the sand paper, a buffer chamois associated with the other side of the strip, a packing interposed between the strip and buffer chamois, and a marginal flange on the strip for securing the buffer chamois in position.

In testimony whereof I affix my signature.

JOSEPH KERN.